United States Patent
Maeng

(10) Patent No.: US 8,363,121 B2
(45) Date of Patent: Jan. 29, 2013

(54) DIGITAL PHOTOGRAPHING DEVICE, METHOD OF CONTROLLING THE SAME, AND COMPUTER-READABLE STORAGE MEDIUM TO SELECT BETWEEN A STILL AND A MOVING IMAGE CAPTURING MODE

(75) Inventor: Sook-young Maeng, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 12/616,914

(22) Filed: Nov. 12, 2009

(65) Prior Publication Data

US 2010/0182442 A1    Jul. 22, 2010

(30) Foreign Application Priority Data

Jan. 22, 2009    (KR) .................. 10-2009-0005572

(51) Int. Cl.
*H04N 5/225* (2006.01)
*H04N 5/228* (2006.01)

(52) U.S. Cl. ................ 348/220.1; 348/208.1; 348/208.2

(58) Field of Classification Search ............. 348/208.99, 348/208.1–208.3, 220.1
See application file for complete search history.

(56) References Cited

U.S. PATENT DOCUMENTS

| | | | | |
|---|---|---|---|---|
| 5,276,512 A * | 1/1994 | Onda | ............................. | 348/620 |
| 5,986,698 A * | 11/1999 | Nobuoka | .................... | 348/208.3 |
| 7,412,079 B2 * | 8/2008 | Fukushima | .................... | 382/107 |
| 7,787,015 B2 * | 8/2010 | Stavely | ....................... | 348/208.1 |
| 7,787,019 B2 * | 8/2010 | Nonaka | ....................... | 348/221.1 |
| 2003/0151672 A1 * | 8/2003 | Robins et al. | ............. | 348/208.6 |
| 2005/0200718 A1 * | 9/2005 | Lee | ............................. | 348/220.1 |
| 2009/0033754 A1 * | 2/2009 | Yoshikawa | ................. | 348/220.1 |
| 2009/0073285 A1 * | 3/2009 | Terashima | ............... | 348/231.99 |
| 2009/0135291 A1 * | 5/2009 | Sugimoto | ...................... | 348/347 |

* cited by examiner

*Primary Examiner* — Kelly L Jerabek
(74) *Attorney, Agent, or Firm* — Drinker Biddle & Reath LLP

(57) ABSTRACT

Provided are a digital photographing device, a method of controlling the same, and a computer-readable storage medium for storing a program for executing the method. The method includes calculating a degree of motion of a subject; determining whether a photographing mode change condition is satisfied based on the degree of motion; determining whether to change a photographing mode according to a predetermined reference, if the photographing mode change condition is satisfied; and changing the photographing mode if it is determined to change the photographing mode, wherein the photographing mode is one of a still image capturing mode and a video capturing mode.

19 Claims, 7 Drawing Sheets

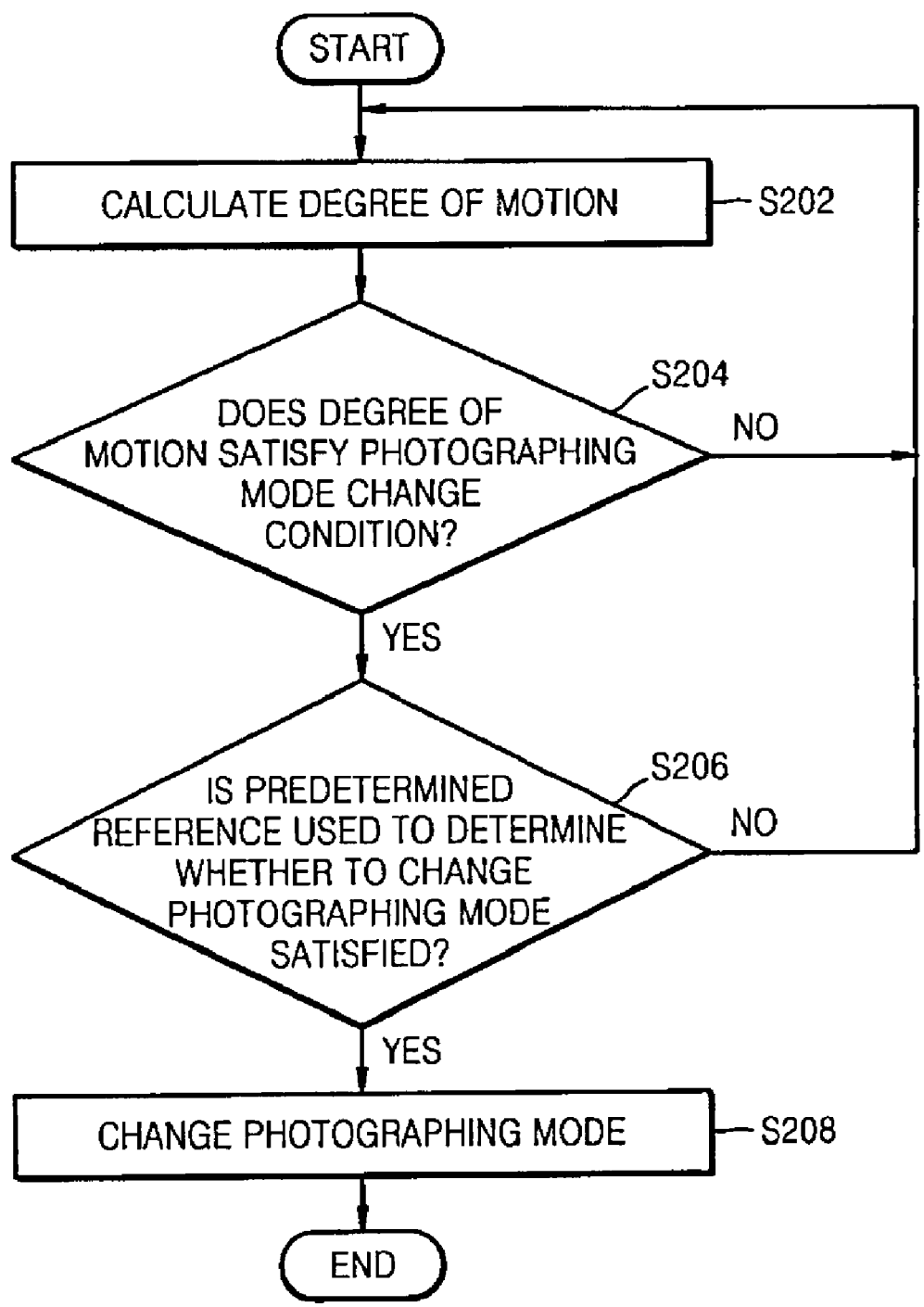

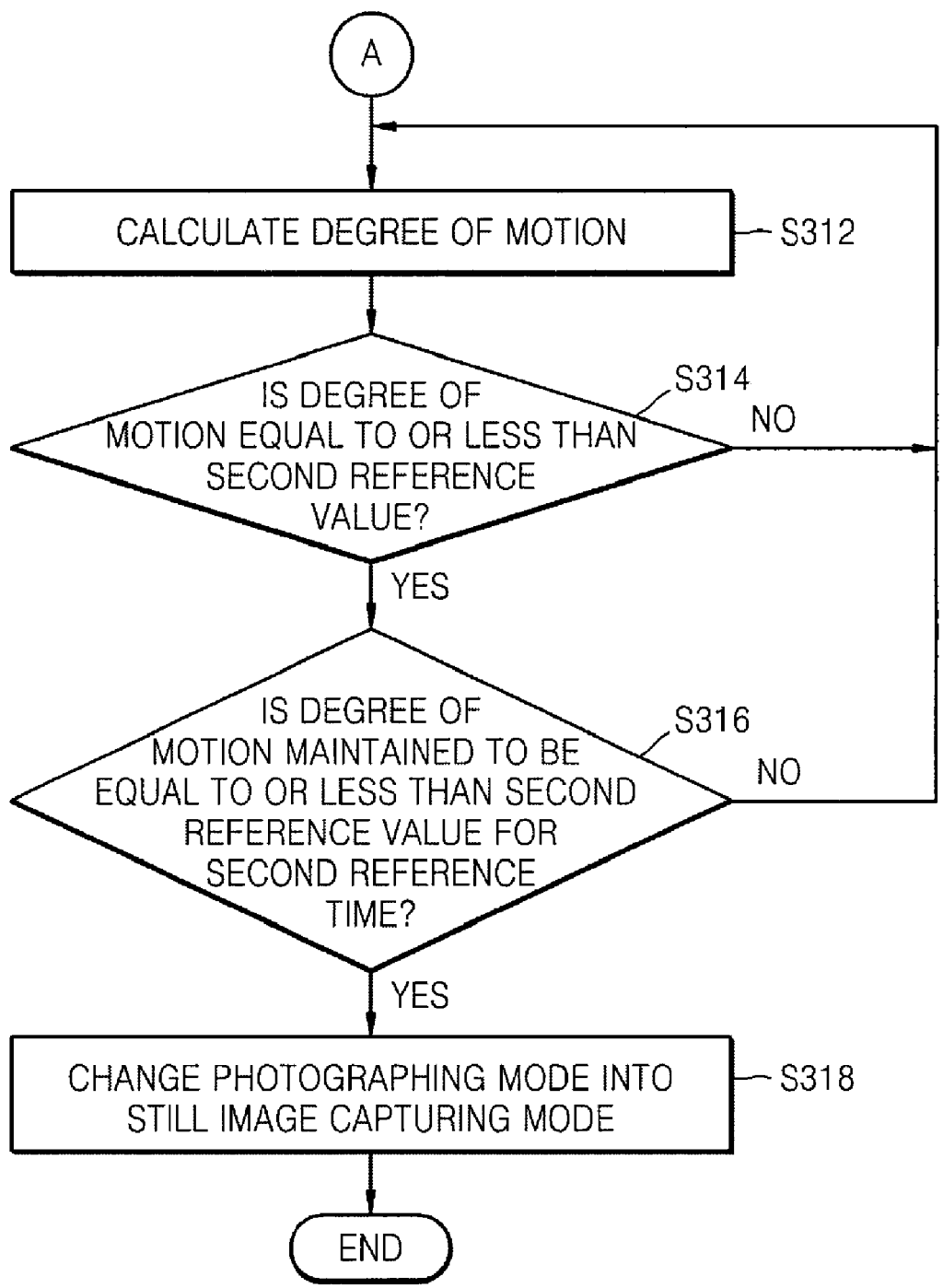

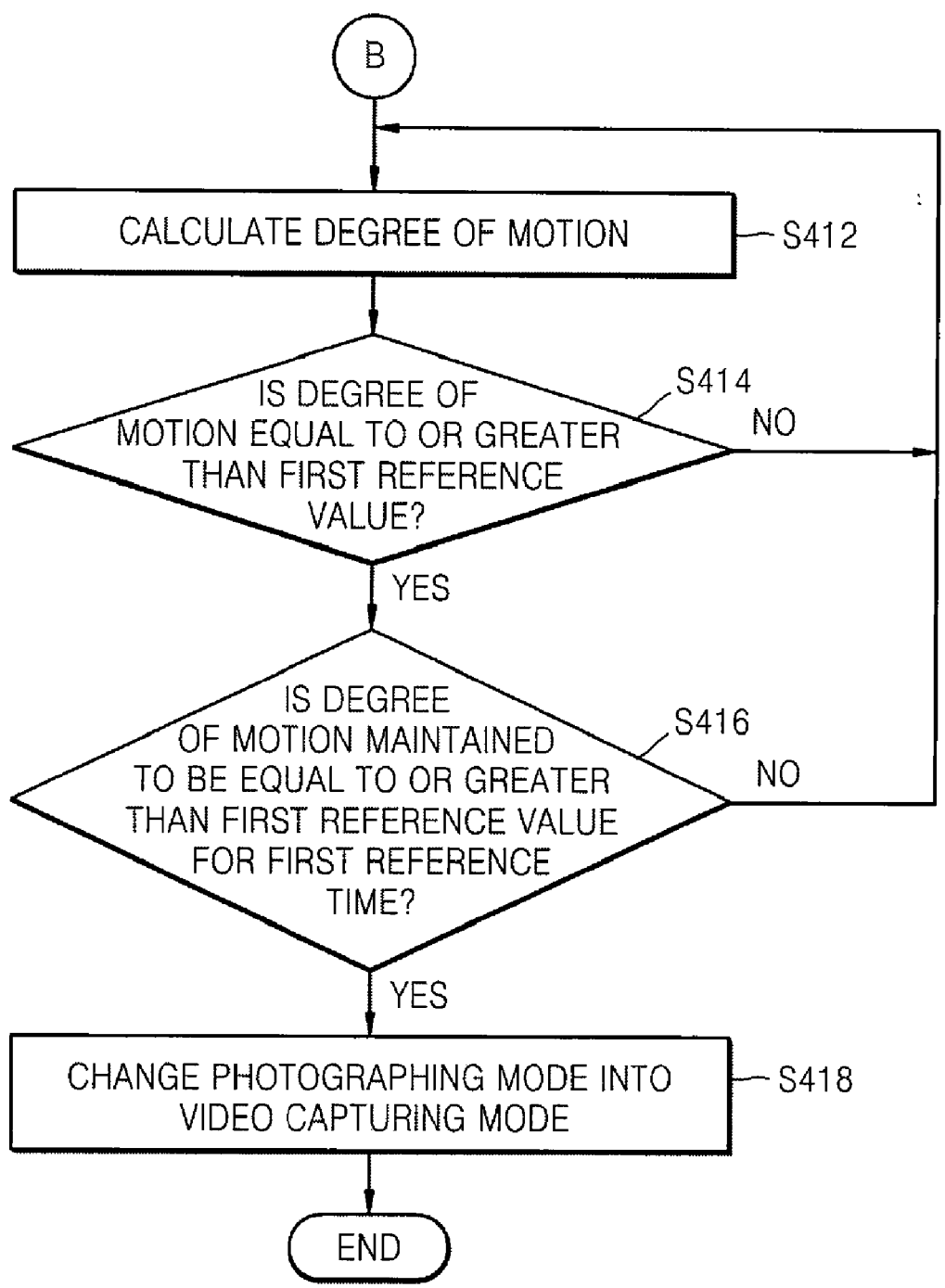

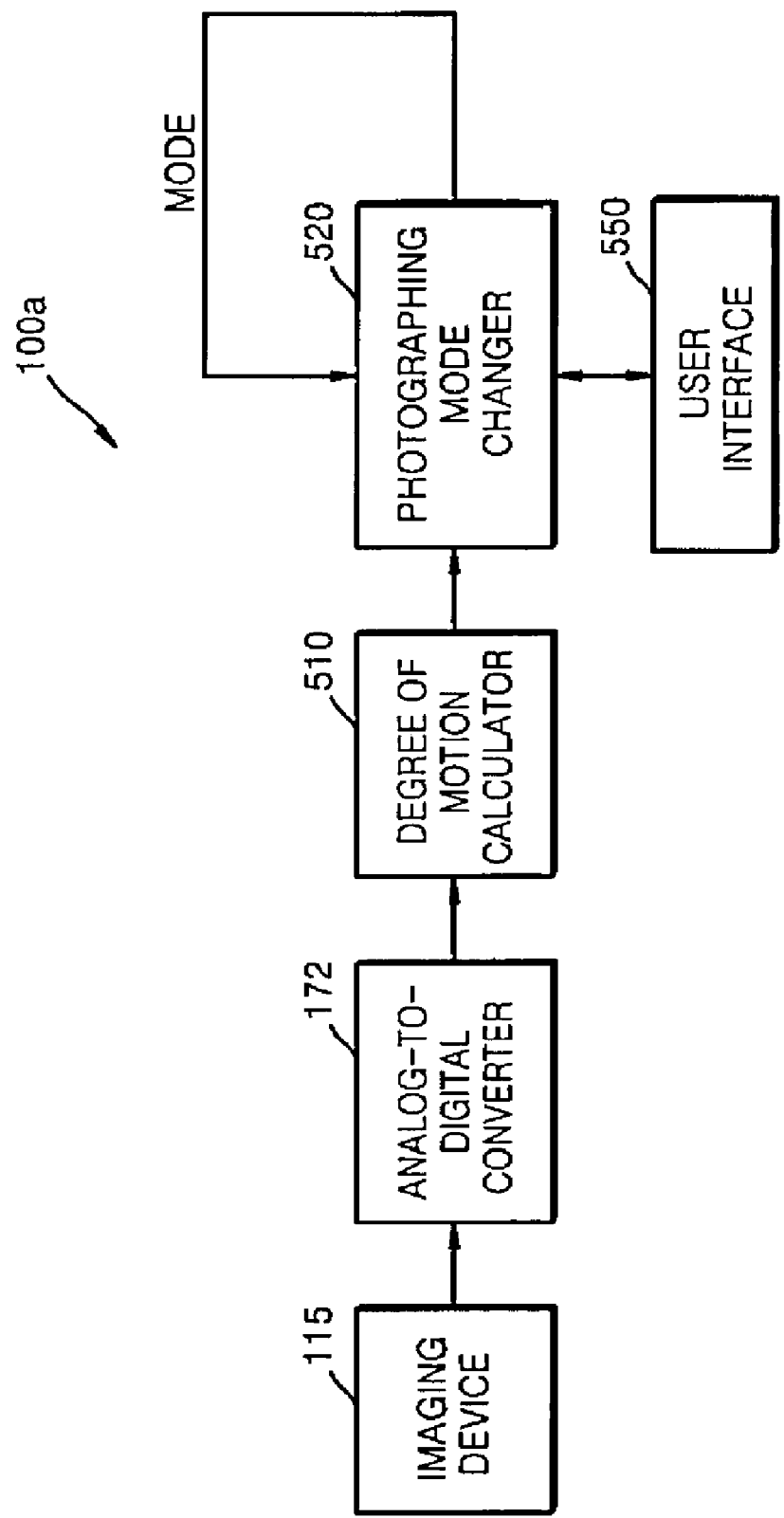

DIGITAL PHOTOGRAPHING DEVICE, METHOD OF CONTROLLING THE SAME, AND COMPUTER-READABLE STORAGE MEDIUM TO SELECT BETWEEN A STILL AND A MOVING IMAGE CAPTURING MODE

CROSS-REFERENCE TO RELATED PATENT APPLICATION

This application claims the benefit of Korean Patent Application No. 10-2009-0005572, filed on Jan. 22, 2009 in the Korean Intellectual Property Office, the contents of which is incorporated herein in its entirety.

BACKGROUND OF THE INVENTION

1. Field of the Invention

The present invention relates to a digital photographing device, a method of controlling the same, and a computer-readable storage medium for storing a program for executing the method.

2. Description of the Related Art

Currently, many digital photographing devices have a video capturing function as well as a still image capturing function. In general, the still image capturing function is mainly used to photograph a still object or a barely moving subject and the video capturing function is mainly used to photograph a greatly moving subject. The still image capturing function has an advantage in that a created file has a small size in comparison to a file created by using the video capturing function. However, if a greatly moving subject is photographed by using the still image capturing function, the subject may appear blurry in a created image file. The video capturing function has an advantage in that a lively video file can be obtained from a greatly moving subject. However, a video file created by using the video capturing function generally has a larger size than a still image file and thus may require a large amount of storage in a digital photographing device that may have limited file storage capacity.

Meanwhile, technology for extracting motion information corresponding to a degree and a direction of motion of a subject from an image input is used often. Many current video compression standards use motion information, such as motion vectors, and an example of such video compression standards is a Moving Picture Experts Group (MPEG) video compression standard.

SUMMARY OF THE INVENTION

The present invention provides a digital photographing device capable of capturing a still image of a greatly moving subject without being out of focused or blurry in a still image capturing mode, a method of controlling the same, and a computer-readable storage medium for storing a program for executing the method.

A method of controlling a digital photographing device is presented. The method includes calculating a degree of motion of a subject in a captured image; and, when the photographing mode is a still image capturing mode, and the calculated motion is greater than a first reference value, changing the photographing mode to a video capturing mode; and, when the photographing mode is in the video image capturing mode, and the calculated motion is less than a second reference value, changing the photographing mode to the still image capturing mode. The method may include changing the photographing mode only when a setting of the digital photographing device is set to change the photographing mode. The step of when the photographing mode is a still image capturing mode may further include when the photographing mode is a still image capturing mode, and the calculated motion is greater than a first reference value for a first reference time, changing a photographing mode to a video capturing mode. The step of when a photographing mode is a video capturing mode may further include when the photographing mode is in the video image capturing mode, and the calculated motion is less than a second reference value for a second reference time, changing the photographing mode to the still image capturing mode.

The step of when a photographing mode is a still image capturing mode may further include when the photographing mode is a still image capturing mode, and the calculated motion is greater than a first reference value, prompting a user whether to change the photographing mode and when the user indicates to change the photographing mode, changing the photographing to a video image capturing mode. The step of when a photographing mode is a video image capturing mode may further include when the photographing mode is in the video image capturing mode, and the calculated motion is less than a second reference value, prompting a user whether to change the photographing mode and when the user indicates to change the photographing mode, changing the photographing mode to the still image capturing mode. The subject may be an in-focus subject.

A digital photographing device is disclosed including an imaging device, configured to capture images; a degree of motion calculator configured to calculate a degree of motion change of a subject in an image captured by the imaging device; and a photographing mode changer configured to change the photographing mode between a still image capturing mode and a video capturing mode based on the degree of motion. The photographing mode changer may be further configured to change the photographing mode from the still image capturing mode to the video image capturing mode when the degree of motion is maintained to be greater than a first reference value for a first reference time. The photographing mode changer may be further configured to change the photographing mode from the video image capturing mode to the still image capturing mode when the degree of motion is maintained to be less than a first reference value for a first reference time. The photographing mode changer may be further configured to provide a user-selectable user interface for prompting a user whether to change the photographing mode, and if the user selects not to change the photographing mode, then not changing the photographing mode. The photographing mode changer may be configured to automatically change the photographing mode without prompting a user. The subject may an in-focus subject.

Disclosed is a computer-readable medium encoded with a computer-executable program to perform a method including calculating a motion change of a subject in a captured image; and, when the photographing mode is a still image capturing mode, and the calculated motion is greater than a first reference value, changing a photographing mode to a video capturing mode; and, when the photographing mode is in the video image capturing mode, and the calculated motion is less than a second reference value, changing the photographing mode to the still image capturing mode. The method may include when the photographing mode is a still image capturing mode, and the calculated motion is greater than a first reference value, changing a photographing mode to a video capturing mode; and, when the photographing mode is in the video image capturing mode, and the calculated motion is less than a second reference value, changing the photographing mode to the still image capturing mode. The method may include changing the photographing mode only when a setting of the digital photographing device is set to change the photographing mode. The method may include when the photographing mode is a still image capturing mode, and the calculated motion is greater than a first reference value a first reference time, changing a photographing mode to a video capturing mode. The method may include changing the photographing mode to the still image capturing mode, if the photographing mode is in the video image capturing mode, and the calculated motion is less than a second reference value for a second reference time. The method may include when the photographing mode is a still image capturing mode, and the calculated motion is greater than a first reference value, and when prompting a user whether to change the photographing mode and the user indicates to change the photographing mode, changing the photographing to a video image capturing mode. The method may include when the photographing mode is in the video image capturing mode, and the calculated motion is less than a second reference value, prompting a user whether to change the photographing mode and when the user indicates to change the photographing mode, changing the photographing mode to the still image capturing mode

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart illustrating an example of a method of controlling a digital photographing device, according to the present invention;

FIGS. 3A and 3B are flowcharts illustrating an example of a method of controlling a digital photographing device in a still image capturing mode, according to the present invention;

FIGS. 4A and 4B are flowcharts illustrating an example of a method of controlling a digital photographing device in a video capturing mode, according to the present invention; and FIG. 5 is a block diagram of an example of a digital photographing device according to the present invention.

DETAILED DESCRIPTION OF THE INVENTION

Hereinafter, the present invention will be described in detail with reference to the attached drawings. In the following description, only some parts for understanding operation of the present invention will be described and other parts that can be easily realized by one of ordinary skill in the art may be omitted.

Also, the invention should not be construed as being limited to the following embodiments.

The present invention will now be described by explaining exemplary embodiments of the invention with reference to the attached drawings.

Figure 1:
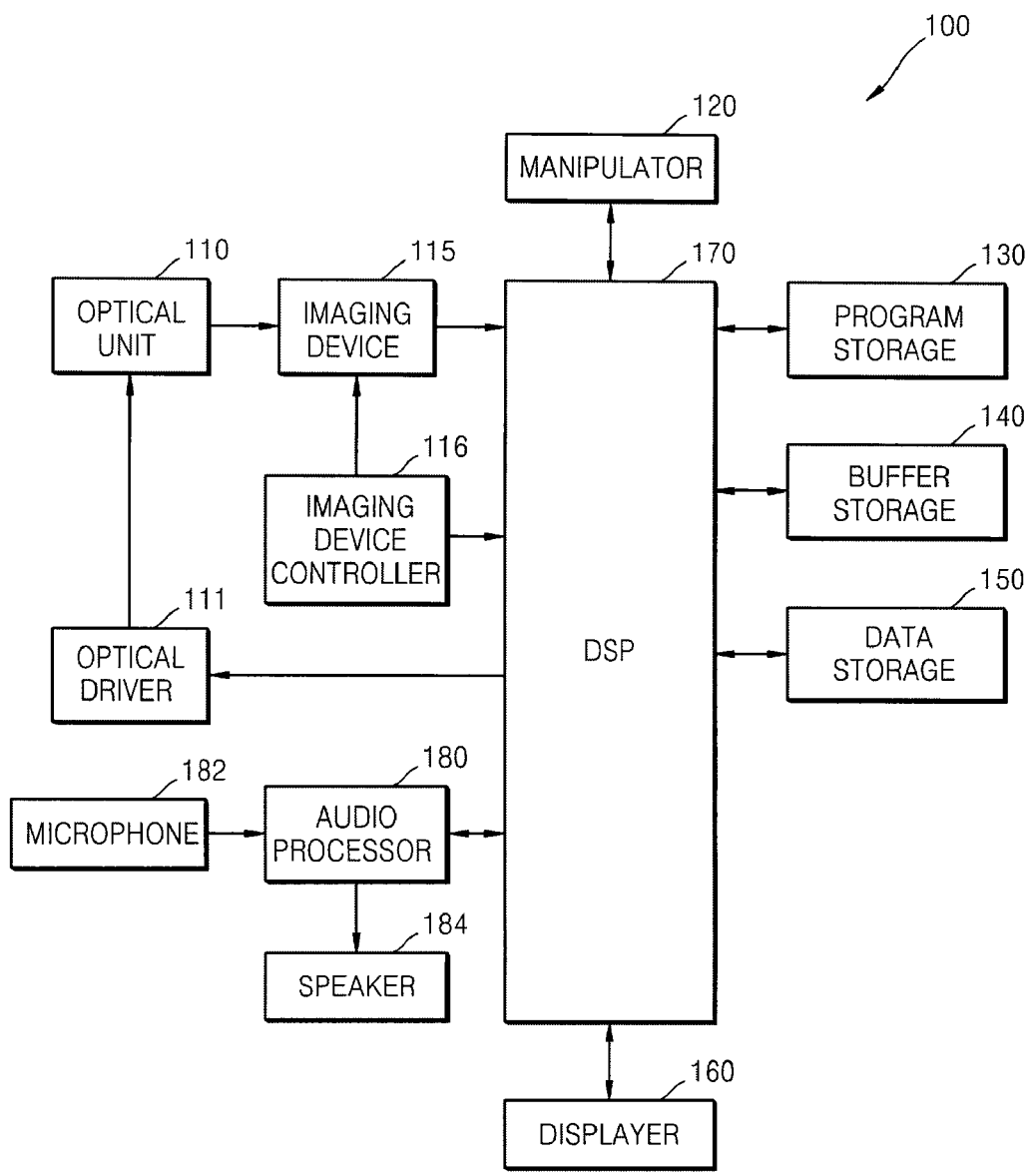
FIG. 1 is an example of a block diagram of an exemplary digital photographing device.

FIG. 1 is an example of a block diagram of an exemplary digital photographing device 100.

Referring to FIG. 1, the digital photographing device 100 may include an optical unit 110, an optical driver 111, an imaging device 115, an imaging device controller 116, a manipulator 120, a program storage 130, a buffer storage 140, a data storage 150, a displayer 160, a digital signal processor (DSP) 170, an audio processor 180, a microphone 182, and a speaker 184.

The optical unit 110 receives an optical signal corresponding to a subject and provides the optical signal to the imaging device 115. The optical unit 110 may include at least one lens such as a zoom lens that narrows or widens a viewing angle by adjusting a focal length of the zoom lens and a focus lens that focuses on the subject. Also, the optical unit 110 may further include an iris that controls light intensity.

The optical driver 111 controls positioning of the lens and opening of the iris. The subject may be in focus by controlling the positioning of the lens. Also, the light intensity may be controlled by controlling the opening of the iris. The optical driver 111 may control the optical unit 110 according to a control signal that is automatically generated in response to an image signal input in real-time or a control signal that is manually input by a user's manipulation.

The optical signal passed through the optical unit 110 reaches a light-receiving surface of the imaging device 115 so as to form an image of the subject. The imaging device 115 is a device for converting an optical signal into an electric signal, for example, a charge-coupled device (CCD) or a complementary metal oxide semiconductor image sensor (CIS). For example, sensitivity of the imaging device 115 may be controlled by the imaging device controller 116. The imaging device controller 116 may control the imaging device 115 according to a control signal that is automatically generated in response to an image signal input in real-time or a control signal that is manually input by the user's manipulation.

The manipulator 120 may receive a control signal input from outside the digital photographing device 100, for example, by the user. The manipulator 120 includes various function buttons: a shutter release button for taking a picture by exposing the imaging device 115 to light for a predetermined time, a power button for powering on the digital photographing device 100, wide-zoom and tele-zoom buttons for widening or narrowing the viewing angle according to an input, text input buttons, a mode selection button for selecting a photographing mode or a reproducing mode, and setting buttons for setting white balance and exposure. Although the manipulator 120 may include the above-described various buttons, the present invention is not limited thereto. The manipulator 120 may be implemented in any form, such as a keyboard, a touch pad, or a remote controller, through which the user may input signals.

Also, the digital photographing device 100 includes the program storage 130 for storing programs of, for example, operating and application systems that drive the digital photographing device 100, the buffer storage 140 for temporarily storing data necessary for and result data of various operations, and the data storage 150 for storing various types of data necessary for the programs, for example, image files including image signals.

Furthermore, the digital photographing device 100 includes the displayer 160 for displaying an operation state of the digital photographing device 100 and image data captured by the digital photographing device 100. The displayer 160 may provide visual and/or auditory data for the user. In order to provide visual data, the displayer 160 may be formed of, for example, a liquid crystal display (LCD) panel, an organic light-emitting diode (OLED) panel, or an electrophoretic display panel.

In addition, the digital photographing device 100 includes the DSP 170 that processes input image signals and controls other elements according to the input image signals or external input signals.

The microphone 182 converts sound received from outside the digital photographing device 100 into an electrical audio signal and transmits the audio signal to the audio processor 180. The microphone 182 may be any type of microphone that can be embedded in or connected to the digital photographing device 100.

The audio processor 180 processes an input audio signal and transmits the processed signal to the DSP 170. Also, if the user reproduces a video file, audio processor 180 processes audio data transmitted from the DSP 170 and provides the processed data to the speaker 184.

The speaker 184 is a device for converting an electrical signal into oscillation of a diaphragm and producing sound waves according to the converted electrical signal. When a video file is reproduced, the speaker 184 converts audio data included in a video file into sound waves.

FIG. 2 is a flowchart illustrating an example of a method of controlling a digital photographing device, according to the present invention.

The method according to the present invention includes calculating a degree of motion of a subject as motion information from an image input and determining whether the motion information satisfies a photographing mode change condition. If the motion information satisfies the photographing mode change condition, a photographing mode is changed according to a predetermined reference.

In the present invention, the degree of motion is a value representing numerically how much the subject moves. That is, the degree of motion may be calculated based on, for example, the size of a motion vector or a differential image between frames of the image input.

The method according to the present invention will now be described with reference to FIG. 2.

Referring to FIG. 2, the method begins with operation 202, a degree of motion of a subject is calculated from an image input The image input may be a live-view image input when the digital photographing device operates in a still image capturing mode or may be a live-view image input or a video capturing image input when the digital photographing device operates in a video capturing mode.

The degree of motion may be calculated by using any method that can calculate a degree of motion of a subject. For example, the degree of motion may be calculated based on the size of a motion vector or a differential image between frames of the image input.

The method continues with operation S204, does the degree of motion satisfy a photographing mode change condition. The photographing mode change condition is a reference value of the degree of motion, which is used to determine whether to change a photographing mode. According to an embodiment of the present invention, it may be determined to change the photographing mode if the degree of motion is maintained to be equal to or greater than a first reference value for a first reference time in the still image capturing mode or if the degree of motion is maintained to be equal to or less than a second reference value for a second reference time in the video capturing mode.

If the degree of motion does not satisfy the photographing mode change condition, then the method returns to operation 202, where the degree of motion of the subject is calculated from the image input. If the degree of motion satisfies the photographing mode change condition, the method optionally continues with operation 206, is predetermined reference used to determine whether to change the photographing mode satisfied.

According to an embodiment of the present invention, if the photographing mode change condition is satisfied, a user-selectable user interface is presented to a user and prompts the user whether to change the photographing mode. If the user selects to change the photographing mode, the photographing mode of the digital photographing device is changed. In general, digital photographing devices provide a key that can be manipulated by the user, as the user interface for changing the photographing mode. However, according to another embodiment of the present invention, a user interface faster and easier than the manipulation of the key may be provided so that the user may promptly and simply change the photographing mode. The user interface may be provided by using, for example, a touch screen or a display screen of the digital photographing device, or a combination of additional manipulation keys.

According to another embodiment of the present invention, if the photographing mode change condition is satisfied, the photographing mode is automatically changed without any manipulation by the user. Still another embodiment of the present invention may greatly improve convenience for the user by automatically controlling the digital photographing device to be appropriate for current motion of the subject without any manipulation by the user.

The method continues with operation S208, where if it is determined to change the photographing mode according to the predetermined reference, the photographing mode is changed in operation S208.

Figure 3A:
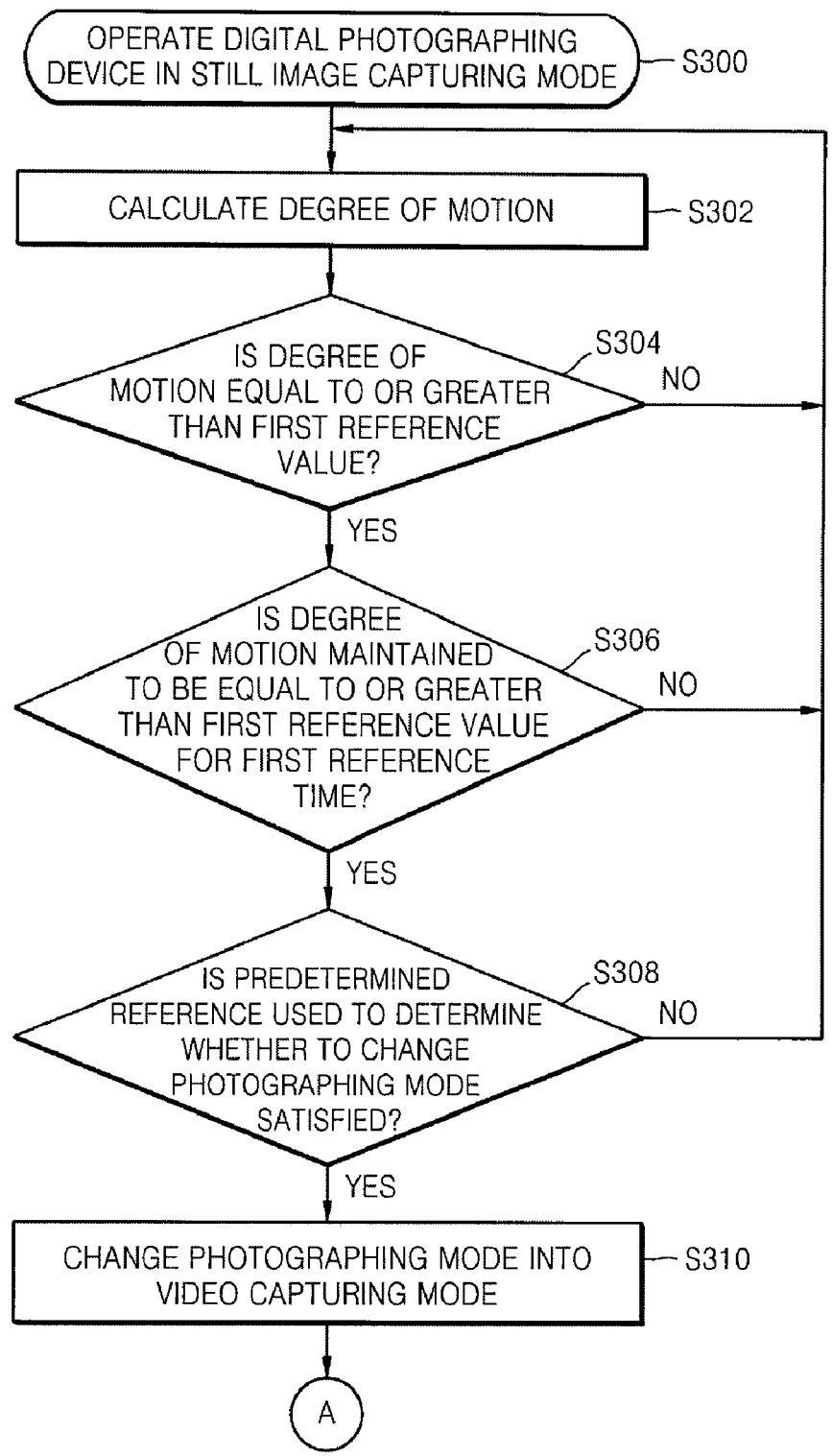

FIGS. 3A and 3B are flowcharts of a method of controlling a digital photographing device that beings in a still image capturing mode, according to the present invention.

Referring to FIG. 3A, when the digital photographing device is in the still image capturing mode, if a degree of motion of a subject is equal to or greater than a first reference value, it is determined to change a photographing mode from the still image capturing mode into a video capturing mode. The method begins with operation S300, where the digital photographing device is operated in the still image capturing mode. The method continues with operation S302, calculate the degree of motion of the subject. The method continues with operation S304, is the degree of motion equal to or greater than a first reference value. The first reference value is a threshold value of a degree of motion, which is used to determine whether to change the still image capturing mode into the video capturing mode. The first reference value may be predetermined by a designer of the digital photographing device or may be determined by a user's selection.

If the degree of motion of the subject is less than the first reference value, the method returns to operation S302. If the degree of motion is equal to or greater than the first reference value, the method optionally continues with operation S306, is degree of motion maintained to be equal to or greater than the first reference value for a first reference time. Optionally, even if the degree of motion is equal to or greater than the first reference value, if the degree of motion is not maintained to be equal to or greater than the first reference value for the first reference time, the method returns to operation S302. The first reference time may be predetermined by the designer of the digital photographing device or may be determined by the user's selection.

The method continues with operation S308, if a photographing mode change condition is satisfied in operation S306, is predetermined reference used to determine whether to change photographing mode satisfied.

According to an embodiment of the present invention, the predetermined reference used to determine whether to change the photographing mode is set by a user's selection input through a user interface. That is, as described above with reference to FIG. 2, if the photographing mode change condition is satisfied, a user-selectable user interface for prompting whether to change the photographing mode is provided and it is determined whether to change the photographing mode according to the user's selection input through the user interface. If the user selects to change the photographing mode, the method continues with operation 310, the photographing mode is changed into the video capturing mode. If the user selects not to change the photographing mode, the photographing mode is not changed and the method returns to operation S302.

According to an embodiment of the present invention, the predetermined reference is used to automatically change the photographing mode if the photographing mode change condition is satisfied in operation S306.

According to still another embodiment of the present invention with respect to another embodiment of the present invention, when a current photographing mode is changed from an original photographing mode, if the degree of motion of the subject satisfies the photographing mode change condition, the photographing mode may be changed automatically without prompting the user through the user interface whether to change the photographing mode.

Another embodiment of the present invention will now be described with reference to FIG. 3B.

Referring to FIG. 3B, in operation S312, after the photographing mode change condition is satisfied and thus the still image capturing mode is changed into the video capturing mode, the degree of motion is calculated in the video capturing mode, and in operations S314 and S316, it is determined whether the degree of motion satisfies the photographing mode change condition. In operation S318, if the degree of motion satisfies the photographing mode change condition, the photographing mode is automatically changed from the video capturing mode to the still image capturing mode without prompting the user.

According to still another embodiment of the present invention, the subject of which the degree of motion is calculated may be an in-focus subject.

Figure 4A:
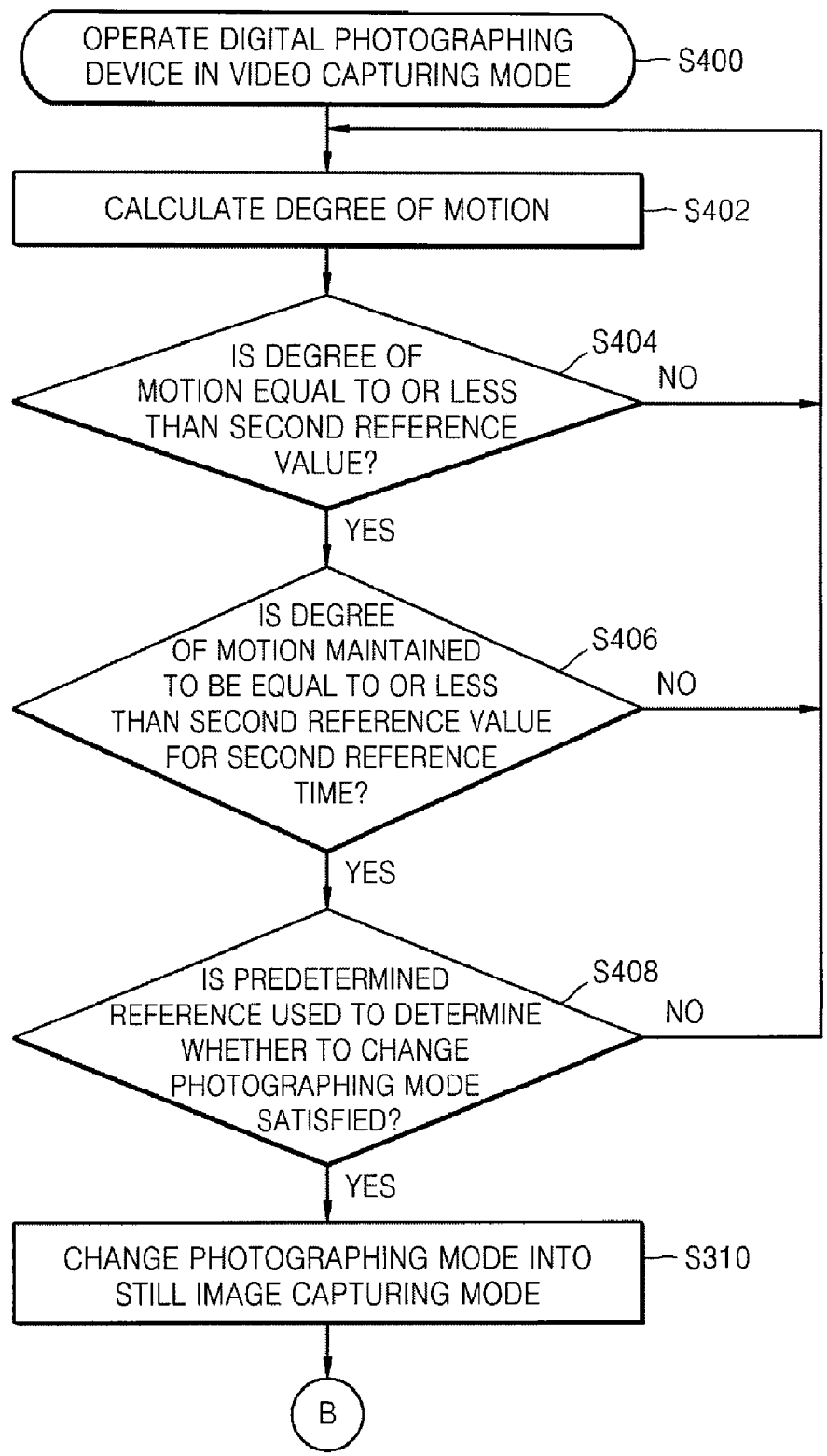

FIGS. 4A and 4B are flowcharts of an example of a method of controlling a digital photographing device in a video capturing mode, according to the present invention.

Referring to FIG. 4A, when the digital photographing device is in the video capturing mode, if a degree of motion of a subject is equal to or less than a reference value, it is determined to change a photographing mode from the video capturing mode into a still image capturing mode.

The method being with operation S400, where the digital photographing device is operated in the video capturing mode. The method continues with operation S402, calculate degree of motion of the subject, and in operation S404, it is determined whether the degree of motion is equal to or less than a second reference value. The second reference value is a threshold value of a degree of motion, which is used to determine whether to change the video capturing mode into the still image capturing mode. The second reference value may be predetermined by a designer of the digital photographing device or may be determined by a user's selection. Also, the second reference value may be the same as or different from the first reference value described above with reference to FIG. 3A.

If the degree of motion of the subject is greater than the second reference value, then the method returns to operation S402. According to an embodiment of the present invention, if the degree of motion is equal to or less than the second reference value, then the method optionally continues with operation S406, is degree of motion maintained to be equal to or less than the second reference value for a second reference time. Optionally, even if the degree of motion is equal to or less than the second reference value, if the degree of motion is not maintained to be equal to or less than the second reference value for the second reference time, the method returns to operation S402. The second reference time may be the same as or different from the first reference time described above with reference to FIG. 3A.

If a photographing mode change condition is satisfied in operation S406, then the method optionally continues with operation S408, is predetermined reference used to determine whether to change the photographing mode satisfied.

According to another embodiment of the present invention, the predetermined reference used to determine whether to change the photographing mode is input through a user interface. If the user selects to change the photographing mode, the method continues with operation S410, where the photographing mode is changed into the still image capturing. If the user selects not to change the photographing mode, the method continues with operation S402, where the photographing mode is not changed and the video capturing mode is maintained.

According to still another embodiment of the present invention, the predetermined reference is used to automatically change the photographing mode if the photographing mode change condition is satisfied in operation S406.

According to an embodiment of the present invention with respect to another embodiment of the present invention, when a current photographing mode is changed from an original photographing mode, if the degree of motion of the subject satisfies the photographing mode change condition, the photographing mode may be changed automatically without prompting the user through the user interface whether to change the photographing mode.

Still another embodiment of the present invention will now be described with reference to FIG. 4B.

Referring to FIG. 4B, in operation S412, after the photographing mode change condition is satisfied and thus the video capturing mode is changed into the still image capturing mode, the degree of motion is calculated in the still image capturing mode, and in operation S414 and S416, it is determined whether the degree of motion satisfies the photographing mode change condition. In operation S418, if the degree of motion satisfies the photographing mode change condition, the photographing mode is automatically changed from the still image capturing mode to the video capturing mode without prompting the user.

FIG. 5 is a block diagram of a digital photographing device 100*a* according to the present invention.

Referring to FIG. 5, the digital photographing device 100*a* includes an imaging device 115, a degree of motion calculator 510, and a photographing mode changer.

As described above with reference to FIG. 1, the imaging device 115 is a device for converting an optical signal into an electric signal, for example, a CCD or a CIS. The digital photographing device 100*a* may further include an analog-to-digital converter 172 for converting an analog signal input from the imaging device 115 into a digital signal.

An image input formed by the imaging device 115 is transmitted to the degree of motion calculator 510. The degree of motion calculator 510 calculates a degree of motion of a subject included in the image input. The image input may be a live-view image input when the digital photographing device 100*a* operates in a still image capturing mode and may be a live-view image input or a video capturing image input when the digital photographing device 100*a* operates in a video capturing mode. The subject may be selected by a user or selected by the digital photographing device 100*a*.

The photographing mode changer 520 determines whether the degree of motion calculated by the degree of motion calculator 510 satisfies a photographing mode change condition. According to an embodiment of the present invention, the photographing mode changer 520 may determine to change a photographing mode if the degree of motion is maintained to be equal to or greater than a first reference value for a first reference time in the still image capturing mode of the digital photographing device 100*a*, or if the degree of motion is maintained to be equal to or less than a second reference value for a second reference time in the video capturing mode of the digital photographing device 100*a*.

If the photographing mode changer 520 determines that the degree of motion satisfies the photographing mode change condition, the photographing mode changer 520 may determine whether to change the photographing mode according to a predetermined reference.

According to an embodiment of the present invention, if the photographing mode change condition is satisfied, the digital photographing device 100*a* provides a user-selectable user interface 550 for prompting whether to change the photographing mode and determines whether to change the photographing mode according to a user's selection input through the user interface 550. If the user selects to change the photographing mode, the photographing mode of the digital photographing device 100*a* is changed.

The user interface 550 may be implemented with, for example, a touch screen or a display screen, or a combination of additional manipulation keys.

According to an embodiment of the present invention with respect to another embodiment of the present invention, when a current photographing mode is changed from an original photographing mode by the photographing mode changer 520, if the degree of motion of the subject satisfies the photographing mode change condition, the photographing mode is automatically changed without prompting the user through the user interface 550 whether to change the photographing mode.

If the photographing mode changer 520 determines to change the photographing mode, the photographing mode changer 520 changes the photographing mode of the digital photographing device 100*a*.

According to still another embodiment of the present invention, the subject of which the degree of motion is calculated may be an in-focus subject.

The degree of motion calculator 510, and the photographing mode changer 520 may be realized by using the program storage 130, which stores programs for performing their functions, and the DSP 170.

Meanwhile, the present invention can also be implemented as computer-readable code on a computer-readable recording medium. The computer-readable recording medium may be a data storage device that can store data and that can be thereafter read by a computer system.

The computer-readable code is configured to perform operations of a method of controlling a digital photographing device, according to the present invention, when the computer-readable code is read from the computer-readable recording medium and is executed by the DSP 170. Also, functional programs, codes, and code segments for accomplishing the present invention can be easily construed by programmers of ordinary skill in the art.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

As described above, according to the present invention, if a subject moves a lot in a still image capturing mode, by changing a photographing mode from the still image capturing mode to a video capturing mode automatically or by a user's selection, a digital photographing device may create a video file that stores every motion of the image of the subject, instead of a still image in which the image of the subject is blurry.

Also, when the user desires to change the photographing mode from the still image capturing mode in order to capture every motion of the subject, the digital photographing device may determine to change the photographing mode in advance and may automatically change the photographing mode or provide a user interface for changing the photographing mode by the user's selection. Thus, the photographing mode may be promptly changed and an important moment may not be missed.

Furthermore, if the subject barely moves in the video capturing mode, by changing the video capturing mode into the still image capturing mode automatically or by the user's selection, the digital photographing device may create a still image file that has a small amount of data, instead of a video file in which the subject barely moves and which has a large amount of data.

By determining whether the photographing mode needs to be changed by using motion information of the subject, and by automatically changing the photographing mode or prompting the user whether to change the photographing mode, the digital photographing device may notify the user that the digital photographing device operates in an inappropriate photographing mode and help the user to promptly change the photographing mode.

The various illustrative logics, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing device, the method comprising:
    calculating a degree of motion of a subject in a captured image;
    when the photographing mode is a still image capturing mode, and the calculated degree of motion is greater than a first reference value, changing the photographing mode to a video capturing mode; and
    when the photographing mode is in the video capturing mode, and the calculated degree of motion is less than a second reference value, changing the photographing mode to the still image capturing mode
    wherein in the still image capturing mode, a still image file is generated as an output file, and in the video capturing mode, a video file is generated as an output file.

2. The method of claim 1, further comprising:
    changing the photographing mode only when a predetermined reference of the digital photographing device is set to change the photographing mode.

3. The method of claim 1, wherein when the photographing mode is a still image capturing mode, further comprises:
    when the photographing mode is a still image capturing mode, and the calculated degree of motion is equal to or greater than a first reference value for a first reference time, changing a photographing mode to a video capturing mode.

4. The method of claim 1, wherein when a photographing mode is a video capturing mode further comprises:
    when the photographing mode is in the video capturing mode, and the calculated degree of motion is equal to or less than a second reference value for a second reference time, changing the photographing mode to the still image capturing mode.

5. The method of claim 1, wherein when a photographing mode is a still image capturing mode further comprises:
    when the photographing mode is a still image capturing mode, and the calculated degree of motion is equal to or greater than a first reference value, prompting a user whether to change the photographing mode and when the user indicates to change the photographing mode, changing the photographing to a video capturing mode.

6. The method of claim 1, wherein when a photographing mode is a video capturing mode further comprises:
    when the photographing mode is in the video capturing mode, and the calculated degree of motion is equal to or less than a second reference value, prompting a user whether to change the photographing mode and when the user indicates to change the photographing mode, changing the photographing mode to the still image capturing mode.

7. The method of claim 1, wherein the subject is an in-focus subject.

8. A digital photographing device comprising:
    an imaging device configured to capture images;
    a degree of motion calculator configured to calculate a degree of motion of a subject in an image captured by the imaging device; and
    a photographing mode changer configured to change the photographing mode from a still image capturing mode to a video capturing mode based on the degree of motion,
    wherein in the still image capturing mode, a still image file is generated as an output file, and in the video capturing mode, a video file is generated as an output file.

9. The digital photographing device of claim 8, wherein the photographing mode changer is further configured to change the photographing mode from the still image capturing mode to the video capturing mode when the degree of motion is maintained to be equal to or greater than a first reference value for a first reference time.

10. The digital photographing device of claim 8, wherein the photographing mode changer is further configured to change the photographing mode from the video capturing mode to the still image capturing mode when the degree of motion is maintained to be equal to or less than a second reference value for a second reference time.

11. The digital photographing device of claim 8, wherein the photographing mode changer is further configured to provide a user-selectable user interface for prompting a user whether to change the photographing mode, and if the user selects not to change the photographing mode, then not changing the photographing mode.

12. The digital photographing device of claim 8, wherein the photographing mode changer is configured to automatically change the photographing mode without prompting a user.

13. The digital photographing device of claim 8, wherein the subject is an in-focus subject.

14. A non-transitory computer-readable medium encoded with a computer-executable program to perform a method comprising:
    calculating a degree of motion of a subject in a captured image;
    when the photographing mode is a still image capturing mode, and the calculated degree of motion is equal to or greater than a first reference value, changing the photographing mode to a video capturing mode; and
    when the photographing mode is in the video capturing mode, and the calculated degree of motion is equal to or less than a second reference value, changing the photographing mode to the still image capturing mode,
    wherein in the still image capturing mode, a still image file is generated as an output file, and in the video capturing mode, a video file is generated as an output file.

15. The computer-readable medium encoded with a computer-executable program of claim 14, the method further comprising:
    changing the photographing mode only when a predetermined reference of the digital photographing device is set to change the photographing mode.

16. The computer-readable medium encoded with a computer-executable program of claim 14, wherein when the photographing mode is a still image capturing mode, further comprises:
    when the photographing mode is a still image capturing mode, and the calculated degree of motion is equal to or greater than a first reference value for a first reference time, changing a photographing mode to a video capturing mode.

17. The computer-readable medium encoded with a computer-executable program of claim 14, wherein when a photographing mode is a video capturing mode further comprises:

when the photographing mode is in the video capturing mode, and the calculated degree of motion is equal to or less than a second reference value for a second reference time, changing the photographing mode to the still image capturing mode.

18. The computer-readable medium encoded with a computer-executable program of claim 14, wherein when a photographing mode is a still image capturing mode further comprises:

when the photographing mode is a still image capturing mode, and the calculated degree of motion is equal to or greater than a first reference value, prompting a user whether to change the photographing mode and when the user indicates to change the photographing mode, changing the photographing to a video capturing mode.

19. The computer-readable medium encoded with a computer-executable program of claim 14, wherein when a photographing mode is a video capturing mode further comprises:

when the photographing mode is in the video capturing mode, and the calculated degree of motion is equal to or less than a second reference value, prompting a user whether to change the photographing mode and when the user indicates to change the photographing mode, changing the photographing mode to the still image capturing mode.

* * * * *